(12) United States Patent
Sasade et al.

(10) Patent No.: US 12,043,246 B2
(45) Date of Patent: Jul. 23, 2024

(54) CONTROL SYSTEM OF VEHICLE

(71) Applicant: TOYOTA JIDOSHA KABUSHIKI KAISHA, Toyota (JP)

(72) Inventors: Shinichi Sasade, Toyota (JP); Tooru Matsubara, Toyota (JP); Hiromasa Tatsushiro, Toyota (JP); Daisuke Suyama, Toyota (JP); Tomoyasu Kimura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 17/496,508

(22) Filed: Oct. 7, 2021

(65) Prior Publication Data

US 2022/0118967 A1 Apr. 21, 2022

(30) Foreign Application Priority Data

Oct. 21, 2020 (JP) .............................. 2020-176977

(51) Int. Cl.
*B60W 20/30* (2016.01)
*B60K 6/387* (2007.10)
(Continued)

(52) U.S. Cl.
CPC ............ *B60W 20/30* (2013.01); *B60K 6/387* (2013.01); *B60K 6/547* (2013.01); *B60W 10/02* (2013.01);
(Continued)

(58) Field of Classification Search
CPC ...... B60W 20/30; B60W 10/02; B60W 10/08; B60W 10/11; B60W 2710/021;
(Continued)

(56) References Cited

U.S. PATENT DOCUMENTS

2001/0056544 A1* 12/2001 Walker .................. B60R 25/102
180/170
2002/0112902 A1* 8/2002 Wakashiro .............. F02D 13/06
903/905

(Continued)

FOREIGN PATENT DOCUMENTS

CN 106065942 A 11/2016
JP 2008179283 A * 8/2008
(Continued)

*Primary Examiner* — Donald J Wallace
*Assistant Examiner* — Jalal C Coduroglu
(74) *Attorney, Agent, or Firm* — Oliff PLC

(57) ABSTRACT

While a vehicle is traveling in an automatic driving mode, an auto-driving oil pressure changing unit makes the engagement pressure of hydraulic oil supplied to a release-side engagement device to be released during a downshift of a stepwise shifting unit, higher than the engagement pressure set during traveling in a manual driving mode, so that retraction of the acceleration due to a drop of drive torque during the downshift is reduced. At this time, an auto-driving rotating machine controller makes drive-side MG2 torque generated from a second rotating machine, larger than that generated during traveling in the manual driving mode, so as to speed up the progress of the downshift, and prevent retraction of the acceleration from being prolonged.

2 Claims, 5 Drawing Sheets

(51) Int. Cl.
  *B60K 6/547* (2007.10)
  *B60W 10/02* (2006.01)
  *B60W 10/08* (2006.01)
  *B60W 10/11* (2012.01)
  *F16D 48/06* (2006.01)

(52) U.S. Cl.
  CPC ............ *B60W 10/08* (2013.01); *B60W 10/11* (2013.01); *F16D 48/066* (2013.01); *B60W 2710/021* (2013.01); *B60W 2710/083* (2013.01); *B60W 2710/1005* (2013.01); *B60W 2710/1077* (2013.01); *B60Y 2200/92* (2013.01); *B60Y 2400/406* (2013.01); *B60Y 2400/70* (2013.01); *F16D 2500/1026* (2013.01); *F16D 2500/1064* (2013.01); *F16D 2500/1082* (2013.01); *F16D 2500/1085* (2013.01)

(58) Field of Classification Search
  CPC ... B60W 2710/083; B60W 2710/1005; B60W 2710/1077; B60W 10/115; B60W 30/19; B60W 2710/1083; B60W 60/00; B60W 60/00186; B60W 2710/1088; B60K 6/387; B60K 6/547; B60K 6/365; B60K 6/445; F16D 48/066; F16D 2500/1026; F16D 2500/1064; F16D 2500/1082; F16D 2500/1085; B60Y 2200/92; B60Y 2400/406; B60Y 2400/70; F16H 3/66; F16H 2003/445; F16H 2200/201; F16H 2200/2043; F16H 61/061; Y02T 10/62; Y02T 10/72

See application file for complete search history.

(56) References Cited

U.S. PATENT DOCUMENTS

| | | | | |
|---|---|---|---|---|
| 2006/0089775 | A1* | 4/2006 | Whitton | F16H 61/061 701/55 |
| 2010/0044132 | A1* | 2/2010 | Matsubara | B60W 20/10 180/65.285 |
| 2014/0296032 | A1* | 10/2014 | Morino | F16H 61/00 477/174 |
| 2015/0111693 | A1* | 4/2015 | Wang | B60W 30/18063 180/65.265 |
| 2016/0312885 | A1* | 10/2016 | Kuwahara | F16H 61/0437 |
| 2017/0297559 | A1* | 10/2017 | Minamikawa | B60K 6/543 |
| 2018/0065618 | A1* | 3/2018 | Nishimine | B60W 10/10 |
| 2018/0180168 | A1* | 6/2018 | Peterson | F16D 25/14 |
| 2020/0040984 | A1* | 2/2020 | Chen | F16H 3/091 |
| 2020/0386279 | A1* | 12/2020 | Choi | F16D 25/14 |
| 2021/0300378 | A1* | 9/2021 | Miyaoka | B60W 10/06 |
| 2022/0063587 | A1* | 3/2022 | Inoue | B60W 10/08 |

FOREIGN PATENT DOCUMENTS

| | | | |
|---|---|---|---|
| JP | 2016-205538 | A | 12/2016 |
| JP | 2017-39427 | A | 2/2017 |
| JP | 2018-040426 | A | 3/2018 |
| JP | 2018-69886 | A | 5/2018 |
| JP | 2018069886 | A * | 5/2018 |

* cited by examiner

| AT GEAR POSITION | C1 | C2 | B1 | B2 | F1 |
|---|---|---|---|---|---|
| 1st | ◯ | | | △ | ◯ |
| 2nd | ◯ | | ◯ | | |
| 3rd | ◯ | ◯ | | | |
| 4th | | ◯ | ◯ | | |
| Rev | ◯ | | | ◯ | |

CONTROL SYSTEM OF VEHICLE

CROSS-REFERENCE TO RELATED APPLICATION

This application claims priority to Japanese Patent Application No. 2020-176977 filed on Oct. 21, 2020, incorporated herein by reference in its entirety.

BACKGROUND

1. Technical Field

The disclosure relates to shift control of a vehicle that includes a driving force source and a transmission, and is able to travel in an automatic driving mode.

2. Description of Related Art

One type of vehicle is known which includes a driving force source, and a transmission provided on a power transmission path between the driving force source and drive wheels, and is able to travel in an automatic driving mode in which the vehicle automatically travels without depending on operation by a driver. One example of this type of vehicle is described in Japanese Unexamined Patent Application Publication No. 2018-040426 (JP 2018-040426 A). In the vehicle configured to be switchable between the automatic driving mode and a manual driving mode, the shift time of the transmission is made longer during traveling in the automatic driving mode, than that in the manual driving mode, so that shift shock is reduced during traveling in the automatic driving mode, as described in JP 2018-040426 A.

SUMMARY

According to the technology described in JP 2018-040426 A, the shift time of the transmission during traveling in the automatic driving mode is increased; thus, as an adverse effect, the acceleration is reduced, or retraction of the acceleration appears, due to a drop of drive torque during a downshift, for an increased length of time. As a result, shock occurs due to the prolonged retraction of the acceleration, and the driver may feel strange or uncomfortable.

This disclosure provides a control system of a vehicle that includes a driving force source and a transmission, and is able to travel in an automatic driving mode, which system can reduce retraction of the acceleration that appears during a downshift of the transmission while the vehicle is traveling in the automatic driving mode, and reduce the strange or uncomfortable feeling given to the driver.

A control system of a vehicle that has a driving force source including at least a rotating machine, and a transmission provided on a power transmission path between the driving force source and drive wheels, is provided according to one aspect of the disclosure. The transmission includes a plurality of engagement devices and is operable to be shifted to a plurality of gear positions when engagement states of the engagement devices are switched. The vehicle is operable in a manual driving mode in which the vehicle travels based on driving operation of a driver, and an automatic driving mode in which driving of the vehicle is performed without depending on the driving operation of the driver. The control system includes an auto-driving oil pressure changing unit that makes an oil pressure of hydraulic oil supplied to one of the engagement devices that is released during a downshift of the transmission while the vehicle is traveling in the automatic driving mode, higher than that set during traveling in the manual driving mode, and an auto-driving rotating machine controller that makes drive-side torque generated from the rotating machine, larger than torque generated during traveling in the manual driving mode, while the oil pressure of the hydraulic oil of the one of the engagement devices is made higher than that set during traveling in the manual driving mode.

In the control system according to the above aspect of the disclosure, during traveling in the automatic driving mode, and during an inertia phase of the downshift of the transmission, the auto-driving oil pressure changing unit may make the oil pressure of the hydraulic oil supplied to the one of the engagement devices that is released during the downshift, higher than that set during traveling in the manual driving mode.

In the control system as described above, during traveling in the automatic driving mode, the auto-driving oil pressure changing unit may make the rate of reduction of the oil pressure of the hydraulic oil supplied to the one of the engagement devices that is released during the downshift of the transmission, smaller than the rate of reduction set during traveling in the manual driving mode.

In the control system as described above, the auto-driving rotating machine controller may control the torque of the rotating machine such that an input rotational speed of the transmission in the inertia phase of the downshift of the transmission increases at substantially the same rate as that during traveling in the manual driving mode.

With the control system as described above, while the vehicle is traveling in the automatic driving mode, the auto-driving oil pressure changing unit makes the oil pressure of the hydraulic oil supplied to the engagement device that is released during a downshift of the transmission, higher than that set during traveling in the manual driving mode, so that retraction of the acceleration due to a drop of drive torque during the downshift is reduced. While the shift time is likely to be prolonged when the oil pressure of the hydraulic oil supplied to the engagement device that is released during the downshift is made higher, the auto-driving rotating machine controller makes the drive-side torque generated from the rotating machine in this period, larger than that set during traveling in the manual traveling mode, so as to speed up the progress of the downshift. Accordingly, the shift time is prevented from being prolonged, and shock that would occur if the retraction of the acceleration lasts for a long time is reduced. As a result, the driver is less likely to feel strange or uncomfortable.

With the control system as described above, during the inertia phase of downshift of the transmission, the auto-driving oil pressure changing unit makes the oil pressure of the hydraulic oil supplied to the engagement device released during the downshift, higher than that set during traveling in the manual driving mode, so that retraction of the acceleration due to a drop of the drive torque, which occurs during the inertia phase, is reduced.

With the control system as described above, the auto-driving oil pressure changing unit makes the rate of reduction of the oil pressure of the hydraulic oil supplied to the engagement device released during the downshift while the vehicle is traveling in the automatic driving mode, smaller than the rate of reduction set during traveling in the manual driving mode, so that retraction of the acceleration due to a drop of the drive torque during the downshift is reduced.

With the control system as described above, the auto-driving rotating machine controller controls the torque of the rotating machine during traveling in the automatic traveling mode, so that the input rotational speed of the transmission in the inertia phase of downshift of the transmission increases at substantially the same rate as that during traveling in the manual driving mode. Thus, the progress speed of gearshift in the inertia phase is substantially equal to that during traveling in the manual driving mode, and the shift time in the inertia phase is prevented from being longer than that in the case of the manual driving mode.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
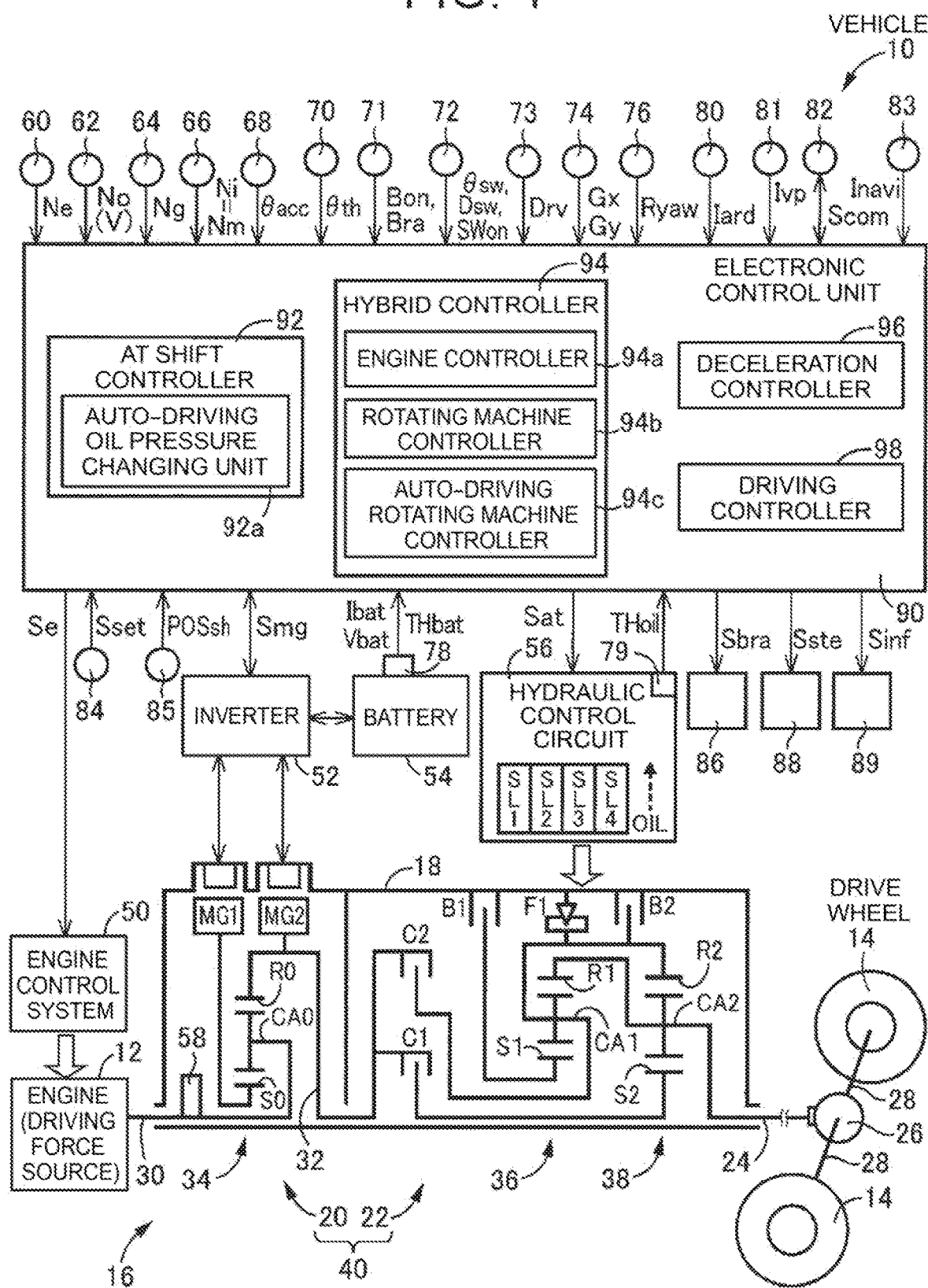
FIG. 1 is a view schematically illustrating the configuration of a vehicle to which the disclosure is applied, and also illustrating control functions and a principal part of a control system for various controls on the vehicle.

Some embodiments of the disclosure will be described in detail with reference to the drawings. In the drawings, parts or components of the embodiments are simplified or modified as needed, and the dimension ratios, shapes, etc. of the parts or components are not necessarily accurate.

First Embodiment

FIG. 1 schematically illustrates the configuration of a vehicle 10 to which the disclosure is applied, and also illustrates a principal part of a control system that performs various controls on the vehicle 10. In FIG. 1, the vehicle 10 includes an engine 12, a first rotating machine MG1, and a second rotating machine MG2. The vehicle 10 also includes drive wheels 14, and a power transmission system 16 provided on a power transmission path between the engine 12 and the drive wheels 14.

The engine 12 is a driving force source capable of generating driving force, and is a known internal combustion engine, such as a gasoline engine or a diesel engine. An engine control system 50 including a throttle actuator, fuel injectors, ignition devices, etc. included in the vehicle 10 is controlled by an electronic control unit 90 that will be described later, so that engine torque Te as output torque of the engine 12 is controlled.

The first rotating machine MG1 and the second rotating machine MG2 are rotating electric machines, or so-called motor-generators, each having a function as an electric motor and a function as a generator. Each of the first rotating machine MG1 and the second rotating machine MG2 is connected to a battery 54 included in the vehicle 10, via an inverter 52 included in the vehicle 10. The inverter 52 is controlled by the electronic control unit 90 that will be described later, so that MG1 torque Tg as output torque of the first rotating machine MG1 and MG2 torque Tm as output torque of the second rotating machine MG2 are controlled. Where the direction of rotation of a rotating machine is the same positive direction as that of the engine 12 in operation, for example, the output torque of the rotating machine is power running torque when it is positive torque generated during acceleration, and is regenerative torque when it is negative torque generated during deceleration. The battery 54 is a power storage device that supplies and receives electric power to and from each of the first rotating machine MG1 and the second rotating machine MG2. The first rotating machine MG1 and the second rotating machine MG2 are provided in a case 18 as a non-rotary member mounted on the vehicle body.

The power transmission system 16 includes an electric stepless shifting unit 20 and a mechanical stepwise shifting unit 22, which are disposed in series on a common axis in the case 18. The electric stepless shifting unit 20 is connected to the engine 12 directly or indirectly via a damper (not shown), for example. The mechanical stepwise shifting unit 22 is connected to the output side of the electric stepless shifting unit 20. The power transmission system 16 also includes a differential gear device 26 connected to an output shaft 24 as an output rotary member of the mechanical stepwise shifting unit 22, and a pair of axles 28 connected to the differential gear device 26. The axles 28 are connected to the drive wheels 14. In the following description, the electric stepless shifting unit 20 will be called "stepless shifting unit 20", and the mechanical stepwise shifting unit 22 will be called "stepwise shifting unit 22". The stepless shifting unit 20, stepwise shifting unit 22, etc. are constructed generally symmetrically with respect to the above-mentioned common axis, and the lower half of each unit below the axis is not illustrated in FIG. 1. The common axis may be the axis of the crankshaft of the engine 12, or a connecting shaft 30 as an input rotary member of the stepless shifting unit 20 coupled to the crankshaft, or the like. The stepwise shifting unit 22 corresponds to the transmission of the disclosure.

The stepless shifting unit 20 includes the first rotating machine MG1, and a differential mechanism 34 that functions as a power split mechanism to mechanically distribute the power of the engine 12 to the first rotating machine MG1 and an intermediate transmission member 32 as an output rotary member of the stepless shifting unit 20. The second rotating machine MG2 is connected to the intermediate transmission member 32 in a power transmittable manner, namely, such that power can be transmitted therebetween. The stepless shifting unit 20 is an electric continuously variable transmission in which the operating state of the first rotating machine MG1 is controlled, so that the differential state of the differential mechanism 34 is controlled. The stepless shifting unit 20 operates as an electric continuously variable transmission of which the speed ratio (which will also be called "gear ratio") γ0 (=engine speed Ne/MG2 speed Nm) is changed. The engine speed Ne is the rotational speed of the engine 12, and is the same value as the input rotational speed of the stepless shifting unit 20, or the rotational speed of the connecting shaft 30. The MG2 speed Nm is the rotational speed of the second rotating machine MG2, and is the same value as the output rotational speed of the stepless shifting unit 20, or the rotational speed of the intermediate transmission member 32. The first rotating machine MG1 is capable of controlling the engine speed Ne, and corresponds to a differential rotating machine. To control the operating state of the first rotating machine MG1 is to perform operation control of the first rotating machine MG1.

The differential mechanism 34 is in the form of a single pinion type planetary gear train, and includes a sun gear S0, a carrier CA0, and a ring gear R0. The engine 12 is connected to the carrier CA0 via the connecting shaft 30 in the power transmittable manner, and the first rotating machine MG1 is connected to the sun gear S0 in the power transmittable manner, while the second rotating machine MG2 is connected to the ring gear R0 in the power transmittable manner. In the differential mechanism 34, the carrier CA0 functions as an input element, and the sun gear S0 functions as a reaction force element, while the ring gear R0 functions as an output element.

The stepwise shifting unit 22 is a mechanical shifting mechanism as a stepwise variable transmission, which provides a part of the power transmission path between the intermediate transmission member 32 and the drive wheels 14, namely, a part of the power transmission path between the stepless shifting unit 20 and the drive wheels 14. The intermediate transmission member 32 also functions as an input rotary member of the stepwise shifting unit 22. The second rotating machine MG2 is connected to the intermediate transmission member 32 such that they can rotate as a unit. The second rotating machine MG2 functions as a driving force source capable of generating driving force for running the vehicle, and corresponds to a rotating machine for traveling driving. Also, the engine 12 is connected to the input side of the stepless shifting unit 20. Thus, the stepwise shifting unit 22 is an automatic transmission provided on the power transmission path between the driving force sources (engine 12, second rotating machine MG2) and the drive wheels 14. The second rotating machine MG2 is connected to the power transmission path between the engine 12 and the drive wheels 14 in the power transmittable manner. Namely, the second rotating machine MG2 is connected to the drive wheels 14 via the stepwise shifting unit 22 in the power transmittable manner. The stepwise shifting unit 22 is a known planetary gear type automatic transmission including, within the case 18, two or more planetary gear trains, i.e., a first planetary gear train 36 and a second planetary gear train 38, and two or more engagement devices, including a one-way clutch F1, clutch C1, clutch C2, brake B1, and brake B2. In the following description, the clutch C1, clutch C2, brake B1, and brake B2 will be simply called engagement devices CB unless they are particularly distinguished from each other.

The engagement devices CB are hydraulic frictional engagement devices, such as a multiple-disk or single-disk clutch or brake that is pressed by a hydraulic actuator, or a band brake tightened by a hydraulic actuator. In operation, the torque capacity of each of the engagement devices CB is changed by a regulated oil pressure (engagement pressure) of hydraulic oil, which is generated from each solenoid valve SL1 to SL4, etc. in a hydraulic control circuit 56 included in the vehicle 10, so that the controlled state, or operating state, of the engagement device CB is switched between an engaged state and a released state, for example.

In the stepwise shifting unit 22, respective rotary elements of the first planetary gear train 36 and second planetary gear train 38 are partially connected to each other, or connected to the intermediate transmission member 32, case 18, or output shaft 24, directly or indirectly via one of the engagement devices CB or the one-way clutch F1. The rotary elements of the first planetary gear train 36 are a sun gear S1, a carrier CA1 and a ring gear R1, and the rotary elements of the second planetary gear train 38 are a sun gear S2, a carrier CA2, and a ring gear R2.

The stepwise shifting unit 22 is a stepwise variable transmission having two or more gear positions of different speed ratios (or gear ratios) γat (=AT input rotational speed Ni/output rotational speed No), and any one of the gear positions is established when a selected one or more of the engagement devices CB is/are engaged. Namely, the stepwise shifting unit 22 is shifted to a selected one of the gear positions, through switching of the engagement states of the engagement devices. In this embodiment, the gear positions formed by the stepwise shifting unit 22 will be called "AT gear positions". The AT input rotational speed Ni is the input rotational speed of the stepwise shifting unit 22, or the rotational speed of the intermediate transmission member 32, and is the same value as the MG2 speed Nm. The AT input rotational speed Ni can be represented by the MG2 speed Nm. The output rotational speed No is the output rotational speed of the stepwise shifting unit 22, namely, the rotational speed of the output shaft 24. The output rotational speed No is also the output rotational speed of a composite transmission 40 as a combination of the stepless shifting unit 20 and the stepwise shifting unit 22. The composite transmission 40 is an automatic transmission that provides a part of the power transmission path between the engine 12 and the drive wheels 14. The engine speed Ne is also the input rotational speed of the composite transmission 40.

Figures 2, 3:
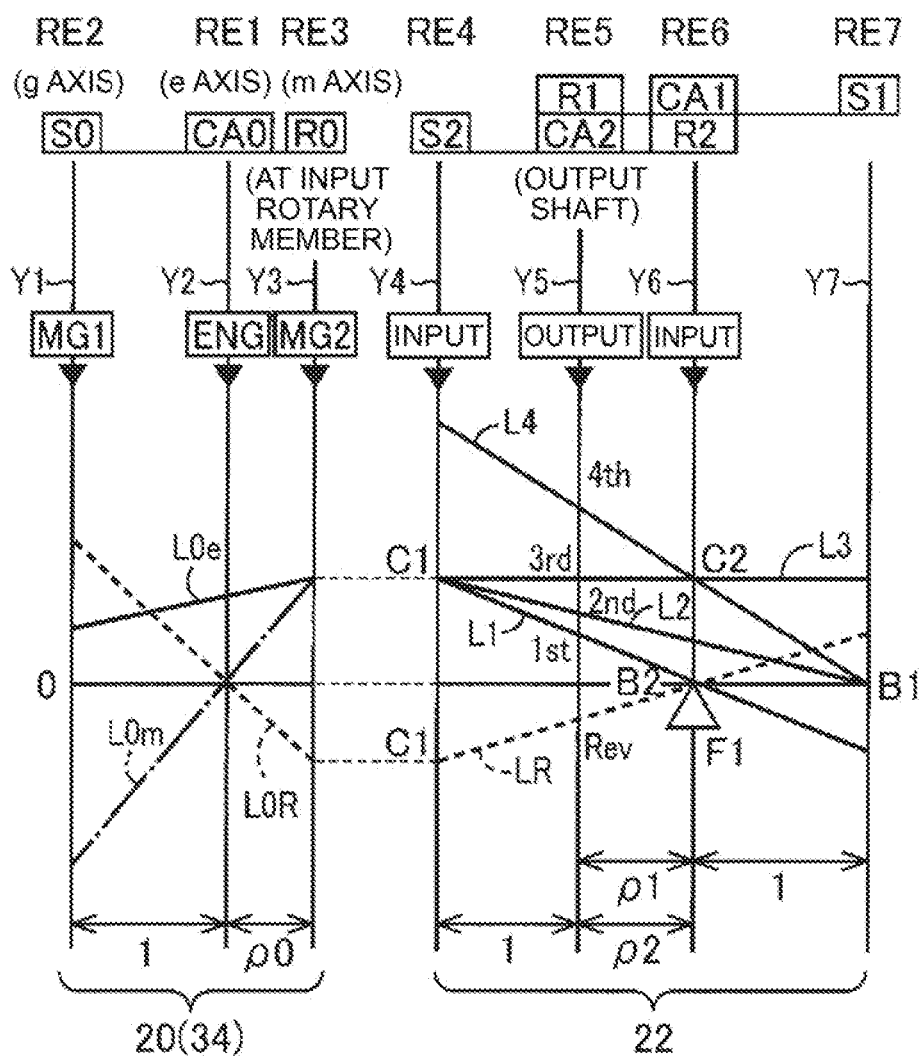
FIG. 2 is an operation table indicating relationships between shift operation of a mechanical stepwise shifting unit of FIG. 1 and a combination of operating states of engagement devices used for the shift operation.
FIG. 3 is a nomographic chart representing relationships of the rotational speeds of respective rotary elements in an electric stepless shifting unit of FIG. 1 and the mechanical stepwise shifting unit.

As indicated in the engagement operation table of FIG. 2, for example, the stepwise shifting unit 22 forms forward-drive four-speed AT gear positions of an AT first-speed gear position ("1st" in FIG. 2) to an AT fourth-speed gear position ("4th" in FIG. 2), as the two or more AT gear positions. The AT first-speed gear position has the largest speed ratio γat, and the speed ratio γat is reduced as the AT gear position is higher. Also, the stepwise shifting unit 22 forms a reverse-drive AT gear position ("Rev" in FIG. 2), through engagement of the clutch C1 and engagement of the brake B2, for example. Namely, when the vehicle 10 travels backward, the AT first-speed gear position is formed, for example. The engagement operation table of FIG. 2 indicates the relationship between each AT gear position, and the operating states of the engagement devices. Namely, the engagement operation table of FIG. 2 indicates the relationship between each AT gear position, and predetermined engagement devices that are placed in the engaged states in the AT gear position. In FIG. 2, "O" represents "engaged", and "Δ" represents "engaged" during engine braking or coasting downshift of the stepwise shifting unit 22, while blank represents "released".

The AT gear position formed by the stepwise shifting unit 22 is changed, namely, a selected one of the AT gear positions is established, by the electronic control unit 90 that will be described later, according to the accelerator operation of the driver, vehicle speed V, and so forth. For example, under shift control of the stepwise shifting unit 22, a gearshift, or so-called clutch-to-clutch gearshift, is carried out, through switching of a selected one or ones of the engagement devices CB between the engaged state and the released state.

The vehicle 10 further includes a MOP 58 as a mechanical oil pump, and an electric oil pump (not shown). The MOP 58 is connected to the connecting shaft 30, and is rotated along with the engine 12, to deliver hydraulic oil OIL used in the power transmission system 16. Also, the electric oil pump (not shown) is driven to deliver hydraulic oil OIL when the engine 12 is stopped, namely, when the MOP 58 is not driven. The hydraulic oil OIL delivered by the MOP 58 or the electric oil pump (not shown) is supplied to the hydraulic control circuit 56. The operating state of each of the engagement devices CB is changed by the corresponding engagement pressure regulated by the hydraulic control circuit 56, using the hydraulic oil OIL.

FIG. 3 is a nomographic chart representing relationships of the rotational speeds of the respective rotary elements in the stepless shifting unit 20 and the stepwise shifting unit 22. In FIG. 3, three vertical lines Y1, Y2, Y3 corresponding to three rotary elements of the differential mechanism 34 that constitutes the stepless shifting unit 20 are "g axis" representing the rotational speed of the sun gear S0 corresponding to a second rotary element RE2, "e axis" representing the rotational speed of the carrier CA0 corresponding to a first rotary element RE1, and "m axis" representing the rotational speed of the ring gear R0 (i.e., the input rotational speed of the stepwise shifting unit 22) corresponding to a third rotary element RE3, respectively, in this order as viewed from the left-hand side. Also, four vertical lines Y4, Y5, Y6, Y7 of the stepwise shifting unit 22 are axes representing the rotational speed of the sun gear S2 corresponding to a fourth rotary element RE4, the rotational speed of mutually coupled ring gear R1 and carrier CA2 corresponding to a fifth rotary element RE5 (i.e., the rotational speed of the output shaft 24), the rotational speed of mutually coupled carrier CA1 and ring gear R2 corresponding to a sixth rotary element RE6, and the rotational speed of the sun gear S1 corresponding to a seventh rotary element RE7, respectively, in this order as viewed from the left-hand side. The intervals of the vertical lines Y1, Y2, Y3 are determined according to the gear ratio ρ0 of the differential mechanism 34. Also, the intervals of the vertical lines Y4, Y5, Y6, Y7 are determined according to the gear ratio ρ1 of the first planetary gear train 36 and the gear ratio ρ2 of the second planetary gear train 38. In the relationships between the vertical axes in the nomographic chart, when the interval between a sun gear and a carrier corresponds to "1", the interval between the carrier and a ring gear corresponds to the gear ratio ρ (=the number of teeth of the sun gear/the number of teeth of the ring gear) of the planetary gear train in question.

Referring to the nomographic chart of FIG. 3, the differential mechanism 34 of the stepless shifting unit 20 is configured to transmit rotation of the engine 12 to the stepwise shifting unit 22 via the intermediate transmission member 32, such that the engine 12 (see "ENG" in FIG. 3) is connected the first rotary element RE1, and the first rotating machine MG1 (see "MG1" in FIG. 3) is connected to the second rotary element RE2, while the second rotating machine MG2 (see "MG2" in FIG. 3) is connected to the third rotary element RE3 that rotates as a unit with the intermediate transmission member 32. In the stepless shifting unit 20, straight lines L0e, L0m, L0R that traverse the vertical line Y2 indicate the relationships between the rotational speed of the sun gear S0 and the rotational speed of the ring gear R0.

Also, in the stepwise shifting unit 22, the fourth rotary element RE4 is selectively connected to the intermediate transmission member 32 via the clutch C1, and the fifth rotary element RE5 is connected to the output shaft 24, while the sixth rotary element RE6 is selectively connected to the intermediate transmission member 32 via the clutch C2, and is selectively connected to the case 18 via the brake B2, and the seventh rotary element RE7 is selectively connected to the case 18 via the brake B1. In the stepwise shifting unit 22, straight lines L1, L2, L3, L4, LR that traverse the vertical line Y5 through control for engaging and releasing the engagement devices CB indicate the rotational speeds of the output shaft 24 in the "1st" gear position, "2nd" gear position, "3rd" gear position, "4th" gear position, and "Rev" gear position, respectively.

The straight line L0e and straight lines L1, L2, L3, L4, which are indicated by solid lines in FIG. 3, indicate the relative speeds of the respective rotary elements when the vehicle travels forward in the HV traveling mode that permits hybrid traveling (=HV traveling) using at least the engine 12 as the driving force source. The HV traveling is engine traveling where the vehicle travels using at least the driving force of the engine 12. In the HV traveling mode, in the differential mechanism 34, when the MG1 torque Tg as reaction force torque in the form of a negative torque generated by the first rotating machine MG1 is applied to the sun gear S0, against the engine torque Te as a positive torque applied to the carrier CA0, engine directly transmitted torque Td ($=Te/(1+\rho 0)=-(1/\rho 0)\times Tg$) that provides positive torque in positive rotation appears in the ring gear R0. Then, depending on the required driving force Frdem, the total torque of the engine directly transmitted torque Td and the MG2 torque Tm is transmitted, as drive torque that acts in the forward direction of the vehicle 10, to the drive wheels 14, via the stepwise shifting unit 22 that is placed in any one of the AT 1st-speed gear position to the AT 4th-speed gear position. The first rotating machine MG1 functions as a generator when it generates negative torque while rotating in the positive direction. The electric power Wg generated by the first rotating machine MG1 is stored in the battery 54, or is consumed by the second rotating machine MG2. The second rotating machine MG2 generates the MG2 torque Tm, using the whole or a part of the generated electric power Wg, or using electric power from the battery 54 in addition to the generated power Wg.

The straight line L0m indicated by a one-dot chain line in FIG. 3 and the straight lines L1, L2, L3, L4 indicated by solid lines in FIG. 3 indicate the relative speeds of the respective rotary elements when the vehicle travels forward in the EV traveling mode that permits motor traveling (=EV traveling) where the vehicle travels using the second rotating machine MG2 as the driving force source while the operation of the engine 12 is stopped. The EV traveling is motor traveling in which the vehicle travels using only the driving force from the second rotating machine MG2. When the vehicle travels forward in the EV traveling mode, the carrier CA0 is rotated at zero (i.e., is not rotated), and the MG2 torque Tm that provides positive torque in positive rotation is applied to the ring gear R0. At this time, the first rotating machine MG1 connected to the sun gear S0 is placed in a no-load condition, and is rotated at no load in the negative direction. Namely, when the vehicle travels forward in the EV traveling mode, the engine 12 is not driven, such that the engine speed Ne is made equal to zero, and the MG2 torque Tm is transmitted as drive torque in the forward direction of the vehicle 10, to the drive wheels 14, via the stepwise shifting unit 22 that is placed in any of the AT gear positions, i.e., the AT 1st-speed gear position to the AT 4th-speed gear position. The MG2 torque Tm mentioned herein is power running torque of positive rotation and positive torque.

The straight line L0R and straight line LR, which are indicated by broken lines in FIG. 3, indicate the relative speeds of the respective rotary elements when the vehicle travels backward in the EV traveling mode. When the vehicle travels backward in the EV traveling mode, the MG2 torque Tm that provides negative torque in negative rotation is applied to the ring gear R0, and the MG2 torque Tm is transmitted as drive torque in the backward direction of the vehicle 10 to the drive wheels 14, via the stepwise shifting unit 22 placed in the AT 1st-speed gear position. In a condition where the AT 1st-speed gear position as a LOW-side AT gear position for forward traveling, as one of the AT gear positions, is formed by the electronic control unit 90 that will be described later, the reverse-drive MG2 torque Tm opposite to the forward-drive MG2 torque Tm generated during forward traveling is generated from the second rotating machine MG2, so that the vehicle 10 travels backward. In this case, the MG2 torque Tm is power running torque of negative rotation and negative torque. In the HV traveling mode, too, it is possible to rotate the second rotating machine MG2 in the negative direction, as indicated by the straight line L0R; thus, the vehicle can travel backward, as in the EV traveling mode.

The vehicle 10 is a hybrid vehicle including the engine 12 and the second rotating machine MG2, as driving force sources for propelling the vehicle. In the power transmission system 16, power generated from the engine 12 and the second rotating machine MG2 is transmitted to the stepwise shifting unit 22, and is transmitted from the stepwise shifting unit 22 to the drive wheels 14, via the differential gear device 26, etc. Thus, the power transmission system 16 transmits the driving force from the driving force sources (engine 12, second rotating machine MG2) to the drive wheels 14. In this connection, power is equivalent to torque or force when they are not particularly distinguished from each other.

Returning to FIG. 1, the vehicle 10 includes the electronic control unit 90 as a controller including the control system of the vehicle 10 associated with control of the engine 12, stepless shifting unit 20, stepwise shifting unit 22, and so forth. FIG. 1 is a view showing an input-output system of the electronic control unit 90, and is also a functional block diagram illustrating a principal part of control functions of the electronic control unit 90. The electronic control unit 90 includes a so-called microcomputer including a central processing unit (CPU), random access memory (RAM), read-only memory (ROM), input-output interface, etc., and the CPU performs various controls on the vehicle 10, by performing signal processing according to programs stored in advance in the ROM, while utilizing the temporary storage function of the RAM. The electronic control unit 90 includes respective computers for engine control, rotating machine control, hydraulic control, etc., as needed.

The electronic control unit 90 receives various signals, etc. based on detection values obtained by various sensors, etc. provided in the vehicle 10. The sensors, etc. include, for example, an engine speed sensor 60, output rotational speed sensor 62, MG1 speed sensor 64, MG2 speed sensor 66, accelerator position sensor 68, throttle opening sensor 70, brake pedal sensor 71, steering sensor 72, driver status sensor 73, G sensor 74, yaw rate sensor 76, battery sensor 78, oil temperature sensor 79, vehicle surrounding information sensor 80, vehicle position sensor 81, external network communication antenna 82, navigation system 83, driving assistance setting switches 84, and shift position sensor 85. The above-mentioned various signals include, for example, the engine speed Ne, output rotational speed No corresponding to the vehicle speed V, MG1 speed Ng as the rotational speed of the first rotating machine MG1, MG2 speed Nm that is the same value as the AT input rotational speed Ni, accelerator pedal stroke $\theta$acc as the amount of accelerator operation by the driver, which represents the magnitude of the accelerating operation by the driver, throttle opening $\theta$th as the opening of an electronic throttle valve, brake-ON signal Bon as a signal indicating a condition where the brake pedal for activating wheel brakes is operated by the driver, brake operation amount Bra representing the magnitude of the driver's operation to depress the brake pedal, steering angle $\theta$sw and steering direction Dsw of the steering wheel included in the vehicle 10, steering-ON signal SWon as a signal indicating a condition where the steering wheel is gripped by the driver, driver status signal Dry as a signal indicating the status of the driver, longitudinal acceleration Gx and lateral acceleration Gy of the vehicle 10, yaw rate Ryaw as the rotation angular velocity about the vertical axis of the vehicle 10, battery temperature THbat, battery charge/discharge current Ibat, and battery voltage Vbat of the battery 54, hydraulic oil temperature THoil as the temperature of the hydraulic oil OIL, vehicle surrounding information Iard, position information Ivp, communication signal Scom, navigation information Inavi, driving assistance setting signal Sset as a signal indicating settings by the driver for driving assistance control CTs, such as automatic driving control or cruise control, operation position POSsh of the shift lever provided in the vehicle 10, and so forth.

The amount of accelerator operation of the driver is, for example, the accelerating operation amount as the operation amount of an accelerating member, such as an accelerator pedal, and represents the amount of output or power requested by the driver to be generated from the vehicle 10. As the output amount requested by the driver, the throttle opening $\theta$th, or the like, may also be used, in addition to the accelerator pedal stroke $\theta$acc.

The driver status sensor 73 includes at least one of a camera that images the driver's facial expression and pupils, for example, biological information sensor that detects biological information of the driver, and so forth, and obtains the driver's conditions, such as the direction of the line of sight or face of the driver, movement of the eyeballs or face, and heartbeat condition.

The vehicle surrounding information sensor 80 includes at least one of a lidar, radar, and vehicle-mounted camera, for example, and directly obtains the vehicle surrounding information Iard as surrounding information of the vehicle 10. The vehicle surrounding information Iard includes information concerning the road on which the vehicle 10 is traveling, and information concerning an object or objects present around the vehicle. The lidar may consist of two or more lidars that respectively detect an object(s) in front of the vehicle 10, object(s) on one side of the vehicle 10, and object(s) behind the vehicle 10, for example, or may be a single lidar that detects objects all around the vehicle 10. The lidar outputs object information concerning the objects thus detected, as the vehicle surrounding information Iard. The radar consists of two or more radars that respectively detect an object(s) in front of the vehicle 10, object(s) in the vicinity of the front, and object(s) in the vicinity of the rear, for example, and outputs object information concerning the objects thus detected, as the vehicle surrounding information lard. The object information obtained by the lidar and radar includes the distance and direction from the vehicle 10 to each of the objects thus detected. The vehicle-mounted camera is a monocular camera or stereo camera that captures an image in front of or behind the vehicle 10, for example, and outputs the captured image information as the vehicle surrounding information Iard. The captured image information includes information, such as lanes of the road on which the vehicle is traveling, traffic signs along the road, parking space, and other vehicles, pedestrians, and obstacles on or along the road.

The vehicle position sensor 81 includes a Global Positioning System (GPS) antenna, for example. The position information Ivp includes own-vehicle position information as information indicating the current position of the vehicle 10 on the ground or on a map, based on a GPS signal (orbital signal) generated by a Global Positioning System (GPS) satellite.

The navigation system 83 is a known navigation system having a display, a speaker, etc. The navigation system 83 specifies the own-vehicle position on map data stored in advance, based on the position information Ivp. The navigation system 83 displays the own-vehicle position on a map displayed on the display. When a destination is entered, the navigation system 83 computes a travel path from a place of departure to the destination, and indicates the travel path, etc. to the driver, via the display, speaker, or the like. The navigation information Inavi includes map information, such as road information and facility information, based on the map data stored in advance in the navigation system 83, for example. The road information includes the type of each road, such as an urban road, suburban road, mountain road, or an automobile expressway or highway, branching or joining of roads, gradient of each road, and speed limit. The facility information includes the types, locations, names, etc. of spots, such as supermarkets, shops, restaurants, parking places, parks, repair shop for the vehicle 10, home, and service areas on expressways. The service areas are spots on expressways, for example, having facilities for parking, meals, and refueling. The road information, etc. included in the navigation information Inavi may be used as the vehicle surrounding information Iard.

The driving assistance setting switches 84 include an automatic driving selection switch for executing automatic driving control, a cruise switch for executing cruise control, a switch for setting the vehicle speed under the cruise control, a switch for setting an inter-vehicle distance between the own vehicle and a leading vehicle under the cruise control, a switch for executing lane-keeping control to cause the vehicle to travel while keeping the set lane, and so forth.

The communication signal Scom includes road traffic information transmitted to or received from a center as an exterior system, such as a road traffic information communication system, for example, and/or vehicle-to-vehicle communication information directly transmitted to or received from another vehicle present in the vicinity of the vehicle 10 with no intervention of the center. The road traffic information includes information on road congestion, accidents, roadworks, required time, parking places, etc., for example. The vehicle-to-vehicle communication information includes vehicle information, travel information, traffic environment information, etc., for example. The vehicle information includes information indicating the vehicle type, such as a passenger car, truck, or motorcycle, for example. The travel information includes information, such as the vehicle speed V, position information, information on operation of the brake pedal, information on flashing of a turn signal lamp, and information on flashing of hazard lamps, for example. The traffic environment information includes information on road congestion, roadworks, etc., for example.

Various command signals are generated from the electronic control unit 90, to respective devices included in the vehicle 10. The devices include, for example, the engine control system 50, inverter 52, hydraulic control circuit 56, external network communication antenna 82, wheel brake device 86, steering device 88, informing device 89, and so forth. The above-mentioned command signals include, for example, an engine control command signal Se for controlling the engine 12, rotating machine control command signal Smg for controlling each of the first rotating machine MG1 and the second rotating machine MG2, hydraulic control command signal Sat for controlling the operating state of each of the engagement devices CB, communication signal Scom, brake control command signal Sbra for controlling the braking torque Tb applied by the wheel brakes, steering control command signal Sste for controlling steering of the wheels (in particular, the front wheels), informing control command signal Sinf for providing the driver with a warning or information, and so forth.

The wheel brake device 86 applies the braking torque Tb produced by the wheel brakes to the wheels. The braking torque Tb is negative torque on the braking side, as part of the drive torque Tr. The wheel brake device 86 supplies brake oil pressures to wheel cylinders provided in the wheel brakes, according to the driver's operation to depress the brake pedal, for example. In the wheel brake device 86, at normal times, a master cylinder oil pressure of a magnitude corresponding to the brake operation amount Bra is supplied as the brake oil pressure to the wheel cylinders. In the meantime, under ABS (antilock brake system) control, anti-skid control, vehicle speed control, or automatic driving control, for example, the wheel brake device 86 supplies a brake oil pressure needed for each control to the wheel cylinders, so that the braking torque Tb is generated by the wheel brakes. The wheels are the drive wheels 14 and driven wheels (not shown).

The steering device 88 applies assist torque corresponding to the vehicle speed V, steering angle θsw and steering direction Dsw, yaw rate Ryaw, etc. to a steering system of the vehicle 10. Under the automatic driving control, for example, the steering device 88 applies torque that controls turning of the front wheels to the steering system of the vehicle 10.

The informing device 89 provides the driver with a warning or information, when there arises any failure related to traveling of the vehicle 10, or a function related to traveling of the vehicle 10 deteriorates, for example. The informing device 89 is in the form of a display device, such as a monitor, display, or alarm lamp, and/or a sound output device, such as a speaker or a buzzer. The display device gives visual warnings or information to the driver. The sound output device gives auditory warnings or information to the driver.

The electronic control unit 90 functionally includes an AT shift controller 92, hybrid controller 94, deceleration controller 96, and driving controller 98, so as to accomplish various controls on the vehicle 10.

Figure 4:
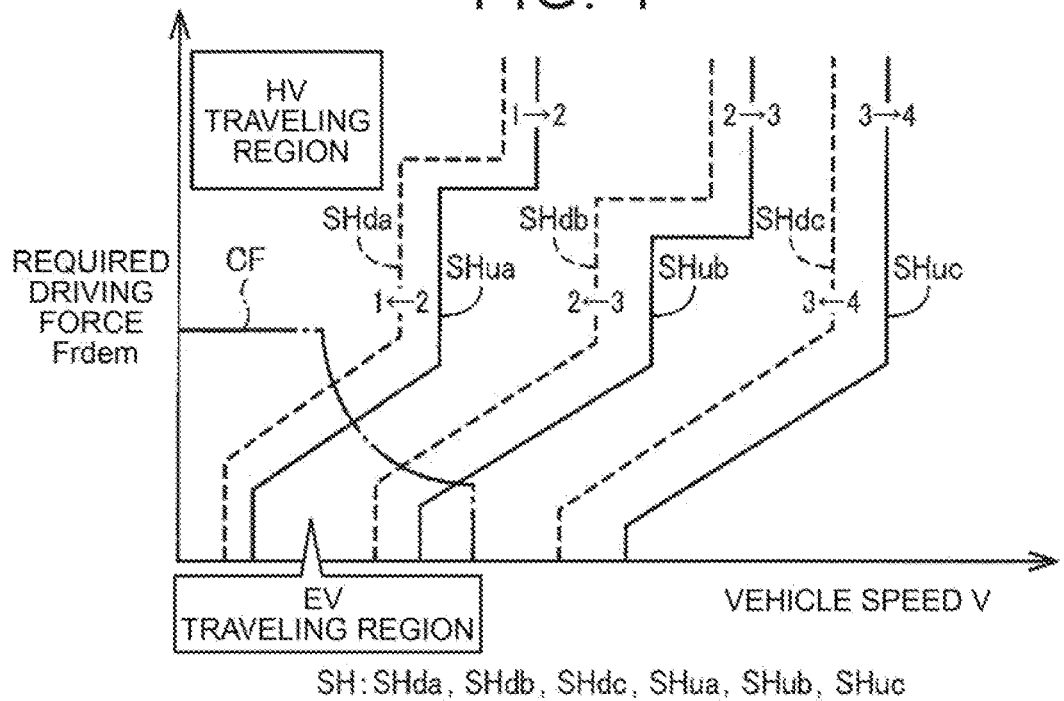
FIG. 4 is a view showing one example of an AT gear position shift map used for shift control of the mechanical stepwise shifting unit of FIG. 1, and a traveling mode switching map used for traveling mode switching control, and also showing the relationship of the maps.

The AT shift controller 92 makes a shift determination on the stepwise shifting unit 22, using an AT gear position shift map as shown in FIG. 4, for example, which indicates predetermined relationships empirically or computationally obtained and stored in advance, and outputs the hydraulic control command signal Sat for executing shift control on the stepwise shifting unit 22 to the hydraulic control circuit 56 as needed. Also, the AT shift controller 92 has a function as an auto-driving oil pressure changing unit 92*a* that controls the MG2 torque Tm of the second rotating machine MG2, when the stepwise shifting unit 22 is shifted down during traveling in the automatic driving mode. Specific control functions of the auto-driving oil pressure changing unit 92*a* will be described later.

In FIG. 4, the AT gear position shift map indicates given relationships having a plurality of predetermined types of shift lines SH based on which a gearshift of the stepwise shifting unit 22 is determined, on a two-dimensional coordinate system having the vehicle speed V and the required driving force Frdem as variables, for example. Here, the output rotational speed No, or the like, may be used in place of the vehicle speed V. Also, the required drive torque Trdem, accelerator pedal stroke One, throttle opening θth, or the like, may be used in place of the required driving force Frdem. The plural types of shift lines SH include upshift lines SHua, SHub, SHuc as indicated by solid lines and used when determining an upshift, and downshift lines SHda, SHdb, SHdc as indicated by broken lines and used when determining a downshift.

The hybrid controller 94 functionally includes an engine controller 94*a* that controls operation of the engine 12, a rotating machine controller 94*b* that controls operation of the first rotating machine MG1 and the second rotating machine MG2 via the inverter 52, and an auto-driving rotating machine controller 94*c* that controls the MG2 torque Tm of the second rotating machine MG2 when the stepwise shifting unit 22 is shifted down during traveling in the automatic driving mode. With these control functions, the hybrid controller 94 performs hybrid drive control, etc. using the engine 12, first rotating machine MG1 and second rotating machine MG2.

The hybrid controller 94 calculates the required driving force Frdem of the drive wheels 14 as the required drive amount, by applying the accelerator pedal stroke θacc and the vehicle speed V to a required drive amount map as a predetermined relationship, for example. As the required drive amount, the required drive torque Trdem [Nm] of the drive wheels 14, required drive power Prdem [W] of the drive wheels 14, required AT output torque of the output shaft 24, or the like, may be used, in addition to the required driving force Frdem [N]. The hybrid controller 94 outputs the engine control command signal Se as a command signal for controlling the engine 12, and the rotating machine control command signal Smg as a command signal for controlling the first rotating machine MG1 and the second rotating machine MG2, so as to achieve the required drive power Prdem based on the required drive torque Trdem and the vehicle speed V, in view of chargeable electric power Win and dischargeable electric power Wout of the battery 54, etc. The engine control command signal Se is a command value of engine power Pe as power of the engine 12 that generates the engine torque Te at the current engine speed Ne, for example. The rotating machine control command signal Smg is a command value of the generated electric power Wg of the first rotating machine MG1 that generates the MG1 torque Tg at the MG1 rotational speed Ng at the time of output of the command, as reaction force torque of the engine torque Te, for example, or a command value of the consumed electric power Wm of the second rotating machine MG2 that generates the MG2 torque Tm at the MG2 speed Nm at the time of output of the command.

The chargeable electric power Win of the battery 54 is the inputtable power that specifies a limit of the input power of the battery 54, and the dischargeable electric power Wout of the battery 54 is the outputtable power that specifies a limit of the output power of the battery 54. The chargeable electric power Win and dischargeable electric power Wout of the battery 54 are calculated by the electronic control unit 90, based on the battery temperature THbat, and the state of charge value SOC [%] corresponding to the amount of charge of the battery 54. The state of charge value SOC of the battery 54 indicates the state of charge of the battery 54, and is calculated by the electronic control unit 90, based on the battery charge/discharge current Ibat and the battery voltage Vbat, for example.

When the stepless shifting unit 20 is operated as a continuously variable transmission, and the composite transmission 40 as a whole is operated as a continuously variable transmission, for example, the hybrid controller 94 controls the engine 12 and also controls the generated electric power Wg of the first rotating machine MG1, so as to achieve the engine speed Ne and engine torque Te that provides the engine power Pe that achieves the required drive power Prdem, in view of the optimum engine operating point, etc., thereby to execute stepless shift control of the stepless shifting unit 20 and change the speed ratio $\gamma 0$ of the stepless shifting unit 20. As a result of the control, the speed ratio $\gamma t$ (=Ne/No) of the composite transmission 40 when it is operated as the continuously variable transmission is controlled. The optimum engine operating point is determined in advance as an engine operating point at which the total fuel efficiency of the vehicle 10 determined from the fuel efficiency of the engine 12 alone in view of the charge/discharge efficiency, etc. of the battery 54 is optimized, when the required engine power Pedem is achieved, for example. The engine operating point is an operating point of the engine 12 represented by the engine speed Ne and the engine torque Te. Thus, in the power transmission system 16, the stepwise shifting unit 22 in which one of the AT gear positions is formed and the stepless shifting unit 20 operated as the continuously variable transmission can constitute the continuously variable transmission as the composite transmission 40 in which the stepless shifting unit 20 and the stepwise shifting unit 22 are disposed in series.

Also, the stepless shifting unit 20 can be shifted up or down like a stepwise variable transmission; thus, in the power transmission system 16, the composite transmission 40 as a whole, which is constituted by the stepwise shifting unit 22 in which one of the AT gear positions is formed and the stepless shifting unit 20 that is shifted up or down like the stepwise variable transmission, can be shifted up or down like the stepwise variable transmission. Namely, in the composite transmission 40, the stepwise shifting unit 22 and the stepless shifting unit 20 can be controlled, so as to establish a selected one of the two or more gear positions having different speed ratios $\gamma t$ each representing the ratio of the engine speed Ne to the output rotational speed No. In this embodiment, the gear position established by the composite transmission 40 will be called "simulated gear position". The speed ratio $\gamma t$ is the total speed ratio formed by the stepless shifting unit 20 and the stepwise shifting unit 22 which are disposed in series, and is equal to a value ($\gamma t = \gamma 0 \times \gamma at$) obtained by multiplying the speed ratio $\gamma 0$ of the stepless shifting unit 20 by the speed ratio $\gamma at$ of the stepwise shifting unit 22.

The simulated gear positions are assigned such that one type or two or more types are established with respect to each AT gear position of the stepwise shifting unit 22, through combination of each AT gear position of the stepwise shifting unit 22 and one type or two or more types of the gear ratio γ0 of the stepless shifting unit 20. For example, the simulated gear positions are determined in advance, such that the simulated 1st-speed gear position to simulated 3rd-speed gear position are established with respect to the AT 1st-speed gear position, and the simulated 4th-speed gear position to simulated 6th-speed gear position are established with respect to the AT 2nd-speed gear position, while the simulated 7th-speed gear position to simulated 9th-speed gear position are established with respect to the AT 3rd-speed gear position, and the simulated 10th-speed gear position is established with respect to the AT 4th-speed gear position. In the composite transmission 40, the stepless shifting unit 20 is controlled so as to provide the engine speed Ne that achieves the given speed ratio γt with respect to the output rotational speed No, so that different simulated gear positions are established with respect to a certain AT gear position. Also, in the composite transmission 40, the stepless shifting unit 20 is controlled in accordance with change of the AT gear position, so that the simulated gear position is changed.

When the stepless shifting unit 20 is shifted up or down like the stepwise variable transmission, so that the composite transmission 40 as a whole is shifted up or down like the stepwise variable transmission, the hybrid controller 94 makes a shift determination of the composite transmission 40, using a simulated gear position shift map as a predetermined relationship, for example, and performs shift control of the stepless shifting unit 20 so as to selectively establish a plurality of simulated gear positions, in coordination with shift control of the AT gear position of the stepwise shifting unit 22 by the AT shift controller 92. The simulated gear positions can be established by controlling the engine speed Ne with the first rotating machine MG1 according to the output rotational speed No, so that the speed ratio γt of each simulated gear position can be maintained. The speed ratio γt of each simulated gear position is not necessarily a constant value over the entire range of the output rotational speed No, but may be changed in a given region, or may be limited by the upper limit, lower limit, etc. of the rotational speed of each part. Thus, the hybrid controller 94 is able to perform shift control to change the engine speed Ne in a stepped manner. The simulated stepwise shift control under which the composite transmission 40 as a whole is shifted up or down like the stepwise variable transmission may be carried out in priority to stepless shift control under which the composite transmission 40 is operated as a continuously variable transmission, when a traveling mode, such as a sporty traveling mode, which emphasizes the traveling performance is selected by the driver, or when the required drive torque Trdem is relatively large, for example. However, the simulated stepwise shift control may be basically executed except when a given limit is imposed on the execution.

The hybrid controller 94 selectively establishes the EV traveling mode or the HV traveling mode as the traveling mode, according to the traveling state. For example, the hybrid controller 94 establishes the EV traveling mode when the vehicle 10 is in an EV traveling region in which the required drive power Prdem is relatively small, using the traveling mode switching map as shown in FIG. 4, for example, as a predetermined relationship, and the hybrid controller 94 establishes the HV traveling mode when the vehicle is in an HV traveling region in which the required drive power Prdem is relatively large.

In FIG. 4, the traveling mode switching map indicates a given relationship having a boundary line between the HV traveling region and the EV traveling region, for use in switching between the HV traveling mode and the EV traveling mode, on the two-dimensional coordinate system having the vehicle speed V and the required driving force Frdem as variables, for example. The boundary line is a predetermined traveling region switching line CF as indicated by a one-dot chain line, for example, based on which switching between the EV traveling and the HV traveling is determined. Since the driving force source used for traveling is switched upon switching of the traveling mode, the traveling region switching line CF is also regarded as a driving force source switching line. In FIG. 4, the traveling mode switching map is shown along with the AT gear position shift map, for the sake of convenience.

When the state of charge value SOC of the battery 54 is smaller than a predetermined engine start threshold value, or when the engine 12 needs to be warmed up, the hybrid controller 94 establishes the HV traveling mode, even when the required drive power Prdem is in the EV traveling region. The engine start threshold value is a predetermined threshold value used for determining that the state of charge value SOC is at such a level that the engine 12 is forced to be started, and the battery 54 needs to be charged.

The hybrid controller 94 performs engine start control for starting the engine 12, when it establishes the HV traveling mode while operation of the engine 12 is stopped. To start the engine 12, the hybrid controller 94 increases the engine speed Ne with the first rotating machine MG1, for example, and executes ignition when the engine speed Ne becomes equal to or higher than a given ignitable rotational speed at which the ignition can be performed. Namely, the hybrid controller 94 starts the engine 12 by cranking the engine 12 with the first rotating machine MG1.

The deceleration controller 96 calculates the required deceleration Grdem, based on the accelerator operation (e.g., the accelerator pedal stroke θacc, or the rate of reduction of the accelerator pedal stroke θacc) by the driver, the vehicle speed V, the gradient of a downhill, braking operation (e.g., the brake operation amount Bra, or the rate of increase of the brake operation amount Bra) by the driver for actuating the wheel brakes, etc., and sets the required braking torque Tbdem for achieving the required deceleration Grdem, using a predetermined relationship. The deceleration controller 96 generates the braking torque Tb of the vehicle 10, so as to provide the required braking torque Tbdem, during deceleration of the vehicle 10. As the deceleration Gr is larger, the braking torque Tb is smaller, namely, the absolute value of the braking torque Tb is larger.

The braking torque Tb of the vehicle 10 is generated in the form of regenerative braking torque Tbr, wheel brake torque Tbw, or engine brake torque Tbe, for example. The regenerative braking torque Tbr is one type of the braking torque Tb obtained through braking under regeneration control of the second rotating machine MG2, namely, through regenerative braking by the second rotating machine MG2. With the regeneration control of the second rotating machine MG2, the second rotating machine MG2 is rotated/driven by driven torque received from the drive wheels 14, to operate as a generator, and the electric power thus generated is supplied to the battery 54 via the inverter 52, to charge the battery 54. The wheel brake torque Tbw is another type of the braking torque Tb obtained by the wheel brakes of the wheel brake device 86. The engine brake torque Tbe is a further type of the braking torque Tb obtained by engine brake due to friction of the engine 12.

As driving control of the vehicle 10, the driving controller 98 can perform manual driving control CTm executed when the vehicle is in a manual driving mode in which the vehicle travels based on driving operation of the driver, and can also perform driving assistance control CTs executed when the vehicle is in an automatic driving mode in which the vehicle 10 is operated without depending on operation by the driver. Under the manual driving control CTm, the vehicle travels in the manual driving mode through driving operation performed by the driver. In the manual driving mode, the vehicle 10 performs normal traveling, based on driving operation, such as accelerator operation, braking operation, steering operation, etc. of the driver. Under the driving assistance control CTs, the vehicle travels with driving assistance for automatically assisting the driver in driving operation, for example. The driving assistance provides a driving method in which the vehicle 10 travels such that its acceleration, deceleration, etc. are automatically performed under control of the electronic control unit 90, based on signals, information, etc. from various sensors, without depending on the driving operation and intention of the driver. The acceleration and deceleration thus automatically performed are, for example, acceleration traveling, deceleration traveling, and steady-state traveling caused by accelerator operation, braking operation, etc., for example.

The driving assistance control CTs is, for example, automatic driving control under which target traveling conditions are automatically set, based on a destination entered by the driver, map information, etc., and the vehicle travels in the automatic driving mode in which acceleration, deceleration, steering, etc. are automatically performed based on the target traveling conditions. The driving assistance control CTs is only required to be driving control for operating the vehicle 10 by automatically performing at least the acceleration and deceleration. The driving assistance control CTs may include automatic vehicle speed control under which the driver performs a part of driving operation, such as steering operation, other than the automatic driving control. One example of the automatic vehicle speed control is the known inter-vehicular distance control (Adaptive Cruise Control (ACC)) as cruise control under which the drive torque Tr including the braking torque Tb is controlled, such that the vehicle speed V follows a target vehicle speed Vtgt set by the driver, or the inter-vehicular distance from a leading vehicle, which is set by the driver, is maintained, for example. Another example of the automatic vehicle speed control is the known automatic vehicle speed limit control (Adjustable Speed Limiter (ASL)) under which the driving force Fr is controlled so that the vehicle speed V does not exceed a target vehicle speed Vtgt set by the driver, for example. In sum, the driving assistance control CTs is driving control under which the vehicle 10 is operated while automatically controlling at least the vehicle speed V based on the vehicle surrounding information Iard, etc.

When the automatic driving selection switch, cruise switch, or the like, included in the driving assistance setting switches 84 is in the OFF position, and driving with the driving assistance is not selected, the driving controller 98 determines traveling in the manual driving mode, and establishes the manual driving mode, to execute the manual driving control CTm. The driving controller 98 executes the manual driving control CTm, by generating commands for controlling the stepwise shifting unit 22, engine 12, first rotating machine MG1, second rotating machine MG2, and wheel brake device 86, to the AT shift controller 92, hybrid controller 94, and deceleration controller 96, so as to accelerate or decelerate the vehicle according to operation of the driver, etc., for example.

When the automatic driving selection switch of the driving assistance setting switches 84 is operated by the driver, and the automatic driving control is selected, the driving controller 98 determines traveling in the automatic driving mode, and establishes the automatic driving mode, to execute the automatic driving control. More specifically, the driving controller 98 automatically sets target traveling conditions, based on the destination entered by the driver, the own-vehicle position information based on the position information Ivp, the map information based on the navigation information Inavi, and various types of information on the road where the vehicle is traveling, based on the vehicle surrounding information Iard, for example. In order to automatically perform acceleration/deceleration and steering based on the target traveling conditions thus set, the driving controller 98 outputs commands for controlling the stepwise shifting unit 22, engine 12, first rotating machine MG1, second rotating machine MG2, and wheel brake device 86, to the AT shift controller 92, hybrid controller 94, and deceleration controller 96, and also outputs the steering control command signal Sste for controlling turning of the front wheels, to the steering device 88, thereby to perform automatic driving control.

During traveling in the automatic driving mode under the driving assistance control CTs, the driver is more susceptible to noise and vibrations, changes in the engine speed Ne, shift shock, etc., than those during traveling in the manual driving mode under the manual driving control CTm. For example, when the stepwise shifting unit 22 is shifted down in a power-ON state in which power is generated from the engine 12 side, the longitudinal acceleration Gx (which will be referred to as "acceleration G") of the vehicle 10 temporarily drops (decreases) due to a drop of the drive torque Tr during the downshift, in other words, a retraction of the acceleration G of the vehicle 10 appears, as known in the art. Due to the retraction of the acceleration G, shock may occur, and the driver may feel uncomfortable or strange. While the retraction of the acceleration G causes no problem during traveling in the manual driving mode under the manual driving control CTm, the driver is more likely to feel shock caused by the retraction of the acceleration G since the driver seeks for a comfortable ride, during traveling in the automatic driving mode under the driving assistance control CTs. The retraction of the acceleration G may be reduced by increasing the downshift duration, and reducing the amount of drop of the drive torque Tr. On the other hand, since the length of time for which the retraction of the acceleration G appears is increased, the driver may feel shock, and feel strange or uncomfortable, because the retraction of the acceleration G is prolonged.

In view of the above situation, when the auto-driving oil pressure changing unit 92a determines execution of a power-ON downshift to shift down the stepwise shifting unit 22 in the power-ON state in which power is transmitted from the engine 12 side, during traveling in the automatic driving mode, it makes the engagement pressure Pcbr (which will be referred to as "engagement pressure Pcbr1") as the oil pressure of hydraulic oil supplied to the engagement device CB (which will be referred to as "release-side engagement device CBr") to be released during the downshift, higher than the engagement pressure Pcbr (which will be referred to as "engagement pressure Pcbr2") of hydraulic oil supplied to the release-side engagement device CBr when the stepwise shifting unit 22 is shifted down during traveling in the manual driving mode. Also, the retraction of the acceleration G appears in the inertia phase in which the rotational speed changes during the downshift. Thus, the auto-driving oil pressure changing unit 92a makes the engagement pressure Pcbr1 of the release-side engagement device CBr, in the inertia phase of the downshift of the stepwise shifting unit 22, during traveling in the automatic driving mode, higher than the engagement pressure Pcbr2 of the release-side engagement device CBr set during traveling in the manual driving mode.

The AT shift controller 92 stores, in advance, the command pressure Pcbr1* of the release-side engagement device CBr in the inertia phase of a downshift of the stepwise shifting unit 22, in the form of a map (which will be referred to as "oil pressure map"), for example. When the AT shift controller 92 determines that the stepwise shifting unit 22 has entered the inertia phase during the downshift, it determines the command pressure Pcbr* of the release-side engagement device CBr in the inertia phase, based on the oil pressure map, and outputs a hydraulic control command signal Sat for controlling the engagement pressure Pcbr of the release-side engagement device CBr to the command pressure Pcbr* thus determined, to the hydraulic control circuit 56. The AT shift controller 92 determines whether the stepwise shifting unit 22 has entered the inertia phase, based on change of the AT input rotational speed Ni, for example.

The oil pressure map consists of the AT input torque Ti, vehicle speed V (or output rotational speed No), hydraulic oil temperature THoil of the hydraulic oil, etc., for example, and is set for each shift pattern of the AT gear positions, for example. In the oil pressure map, specific values of the command pressure Pcbr1* of the release-side engagement device CBr during the inertia phase, the rate of reduction (rate of change) of the command pressure Pcbr1* of the release-side engagement device CBr during the inertial phase, etc., are stored as data.

Here, the auto-driving oil pressure changing unit 92a stores the oil pressure map for use during traveling in the automatic driving mode, separately from the oil pressure map for use during traveling in the manual driving mode. In the oil pressure map for use during traveling in the automatic driving mode, the specific values of the command pressure Pcbr1* of the release-side engagement device CBr during the inertia phase of downshift are set to higher values than those of the command pressure Pcbr2* of the release-side engagement device CBr during the inertia phase in the oil pressure map for use during traveling in the manual driving mode. Accordingly, when the oil pressure map for use during traveling in the automatic driving mode is employed, the engagement pressure Pcbr (which will be referred to as "engagement pressure Pcbr1") as the actual pressure of the release-side engagement device CBr, during the inertia phase of downshift of the stepwise shifting unit 22, is higher than the engagement pressure Pcbr (which will be referred to as "engagement pressure Pcbr2") of the release-side engagement device CBr during traveling in the manual driving mode.

Also, in the oil pressure map for use during traveling in the automatic driving mode, the rate of reduction α1 as the ratio of the amount of change of the command pressure Pcbr1* of the release-side engagement device CBr in the inertia phase of downshift, to the elapsed time, is set to a smaller value than the rate of reduction α2 in the inertia phase of the oil pressure map for use during traveling in the manual driving mode. Accordingly, when the map for use during traveling in the automatic driving mode is employed, the engagement pressure Pcbr1 of the release-side engagement device CBr in the inertia phase of downshift of the stepwise shifting unit 22 is reduced at a lower rate than the engagement pressure Pcbr2 of the release-side engagement device CBr during traveling in the manual driving mode. In this connection, the rate of reduction α1 of the command pressure Pcbr1* may be temporarily set to zero. Namely, during traveling in the automatic driving mode, the engagement pressure Pcbr1 of the release-side engagement device CBr in the inertial phase of downshift may be set so as to be temporarily held at the same level without being reduced.

The auto-driving oil pressure changing unit 92a employs the oil pressure map for use during traveling in the automatic driving mode, when the stepwise shifting unit 22 is shifted down during traveling in the automatic driving mode, so that the engagement pressure Pcbr1 of the release-side engagement device CBr to be released during the inertial phase of downshift of the stepwise shifting unit 22 is made higher than the engagement pressure Pcbr2 in the case during traveling in the manual driving mode. Also, during traveling in the automatic driving mode, the auto-driving oil pressure changing unit 92a makes the rate of reduction α1 of the command pressure Pcbr1 of the release-side engagement device CBr during the inertia phase of downshift of the stepwise shifting unit 22, smaller than the rate of reduction α2 in the case during traveling in the manual driving mode, so that the engagement pressure Pcbr1 of the release-side engagement device CBr during the inertia phase is reduced at a lower rate than the engagement pressure Pcbr2 in the case during traveling in the manual driving mode. As a result, during traveling in the automatic driving mode, the transmission torque that can be transmitted through the stepwise shifting unit 22 during the inertia phase increases to be larger than that in the case during traveling in the manual driving mode; therefore, the drop of the drive torque Tr is reduced, and the amount of retraction (retraction level) of the acceleration G, which corresponds to the drop of the acceleration G during the inertia phase, is also reduced. With regard to the apply-side engagement device CBa to be engaged during the downshift, the same command pressure Pcba* is supposed to be set for the automatic driving mode and the manual driving mode.

In the meantime, when the engagement pressure Pcbr1 of the release-side engagement device CBr in the inertia phase, during traveling in the automatic driving mode, is made higher than that in the case during traveling in the manual driving mode, the progress of the gearshift in the inertia phase becomes slower than that in the case during traveling in the manual driving mode. As a result, the period of the inertia phase is prolonged, and the length of time for which retraction of the acceleration G appears is increased, though the amount of retraction of the acceleration G is reduced. To cope with this situation, the auto-driving rotating machine controller 94c controls the MG2 torque Tm of the second rotating machine MG2, so that the rate of progress of the downshift in the inertial phase of the downshift becomes substantially equal to the rate of progress of the downshift in the inertial phase during traveling in the manual driving mode.

During the inertia phase of downshift, the MG2 torque Tm generated from the second rotating machine MG2 in the inertia phase is drive torque (positive torque) applied in the positive rotational direction, so as to increase the AT input rotational speed Ni toward a post-downshift synchronous rotational speed. Accordingly, in order to progress the gearshift during the inertia phase at the same rate or speed of progress as that in the case during traveling in the manual driving mode, namely, to increase the AT input rotational speed Ni at the same rate as that during traveling in the manual driving mode, the auto-driving rotating machine controller 94c makes the MG2 torque Tm of the second rotating machine MG2 in the inertia phase of downshift of the stepwise shifting unit 22 during traveling in the automatic driving mode, larger than the MG2 torque Tm generated from the second rotating machine MG2 during traveling in the manual driving mode. In other words, while the engagement pressure Pcbr1 of the release-side engagement device CBr is set to be higher than the engagement pressure Pcbr2 in the case during traveling in the manual driving mode, the auto-driving rotating machine controller 94c makes the MG2 torque Tm applied to the drive side of the second rotating machine MG2, larger than that in the case during traveling in the manual driving mode.

Once the inertia phase of downshift of the stepwise shifting unit 22 starts during traveling in the automatic driving mode, the auto-driving rotating machine controller 94c controls the MG2 torque Tm of the second rotating machine MG2, so that the rate of change (rate of increase) dNi/dt of the AT input rotational speed Ni as the input rotational speed of the stepwise shifting unit 22 becomes equal to a given value β set in advance. More specifically, the auto-driving rotating machine controller 94c performs feedback control to control the MG2 torque Tm of the second rotating machine MG2, during the inertia phase, based on a difference K (=|β−dNi/dt|) between the given value β and the rate of change dNi/dt of the AT input rotational speed Ni. Here, the given value β is a value empirically or computationally obtained in advance and stored, and is set to the same value as a target value of the rate of change dNi/dt of the AT input rotational speed Ni during the inertia phase of downshift, which is set in advance in the manual driving mode, for example.

Thus, the auto-driving rotating machine controller 94c controls the MG2 torque Tm of the second rotating machine MG2, so that the AT input rotational speed Ni during the inertia phase of downshift of the stepwise shifting unit 22 increases at the same rate of increase (the given value β) as that in the case during traveling in the manual driving mode. Accordingly, even during traveling in the automatic driving mode, the AT input rotational speed Ni in the inertia phase increases at substantially the same rate of increase as that in the case during traveling in the manual driving mode; therefore, the period of the inertia phase is substantially equal to that in the case during traveling in the manual driving mode. Thus, the period of the inertia phase is prevented from being prolonged, and the shock and uncomfortable feeling given to the driver, due to prolonged retraction of the acceleration G, can be reduced. Under the feedback control, the gearshift progresses in the inertia phase of downshift, at the same speed as that in the case during traveling in the manual driving mode, so that the MG2 torque Tm generated from the second rotating machine MG2 and applied in the positive rotational direction (driving direction) increases to be larger than the MG2 torque Tm generated during traveling in the manual driving mode.

Thus, in the inertia phase of downshift during traveling in the automatic driving mode, the engagement pressure Pcbr1 of the release-side engagement device CBr is made higher than the engagement pressure Pcbr2 in the case during traveling in the manual driving mode, so that the amount of retraction of the acceleration G due to a drop of the drive torque Tr during the inertia phase is reduced. On the other hand, while the shift time in the inertia phase is made longer as the command pressure Pcbr1* of the release-side engagement device CBr is made higher, the MG2 torque Tm applied to the drive side of the second rotating machine MG2 in the inertia phase is increased, to be larger than that in the case during traveling in the manual driving mode, so that the shift time in the inertia phase is prevented from being prolonged. As a result, the shock and uncomfortable feeling given to the driver, due to the increase of the time for which retraction of the acceleration G appears, are reduced.

Figure 5:
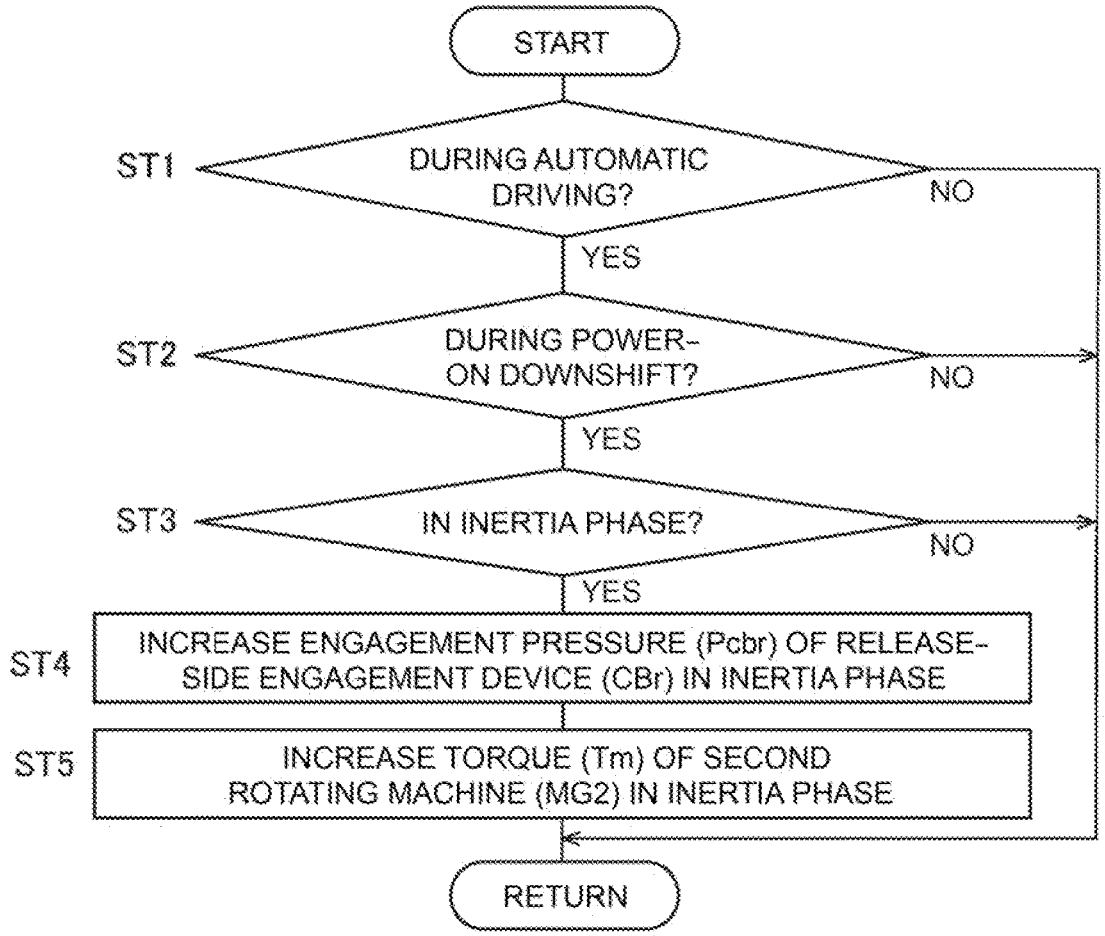
FIG. 5 is a flowchart illustrating a principal part of control operation of an electronic control unit, namely, control operation that can reduce retraction of the acceleration that appears in the inertia phase of a downshift of the stepwise shifting unit during traveling in an automatic driving mode.

FIG. 5 is a flowchart illustrating a principal part of control operation of the electronic control unit 90, namely, control operation to reduce retraction of the acceleration G which would occur during the inertia phase, in a downshift of the stepwise shifting unit 22 during traveling in the automatic driving mode. A control routine of this flowchart is repeatedly executed during traveling of the vehicle 10.

Initially, in step ST1 corresponding to a control function of the driving controller 98, it is determined whether the vehicle 10 is traveling in the automatic driving mode. When a negative decision (NO) is obtained in step ST1, the control returns. When an affirmative decision (YES) is obtained in step ST1, it is determined in step ST2 corresponding to a control function of the auto-driving oil pressure changing unit 92a whether a power-ON downshift is being performed, namely, the stepwise shifting unit 22 is shifted down in a condition where power is transmitted from the engine 12 side. When a negative decision (NO) is obtained in step ST2, the control returns. When an affirmative decision (YES) is obtained in step ST2, it is determined in step ST3 corresponding to a control function of the auto-driving oil pressure changing unit 92a whether the stepwise shifting unit 22 is in the inertia phase of the downshift. When a negative decision (NO) is obtained in step ST3, the control returns. When an affirmative decision (YES) is obtained in step ST3, the command pressure Pcbr1* of the release-side engagement device CBr in the inertia phase is set to a higher value than the command pressure Pcbr2* set during traveling in the manual driving mode, in step ST4 corresponding to a control function of the auto-driving oil pressure changing unit 92a. As a result, the engagement pressure Pcbr1 as the actual pressure of the release-side engagement device CBr becomes higher than the engagement pressure Pcbr2 in the case during traveling in the manual driving mode. Then, in step ST5 corresponding to a control function of the auto-driving rotating machine controller 94c, the MG2 torque Tm of the second rotating machine MG2 in the inertia phase is increased to be larger than the MG2 torque Tm in the case during traveling in the manual driving mode, so that the downshift in the inertia phase progresses at the same speed as that in the case during traveling in the manual driving mode.

Figure 6:
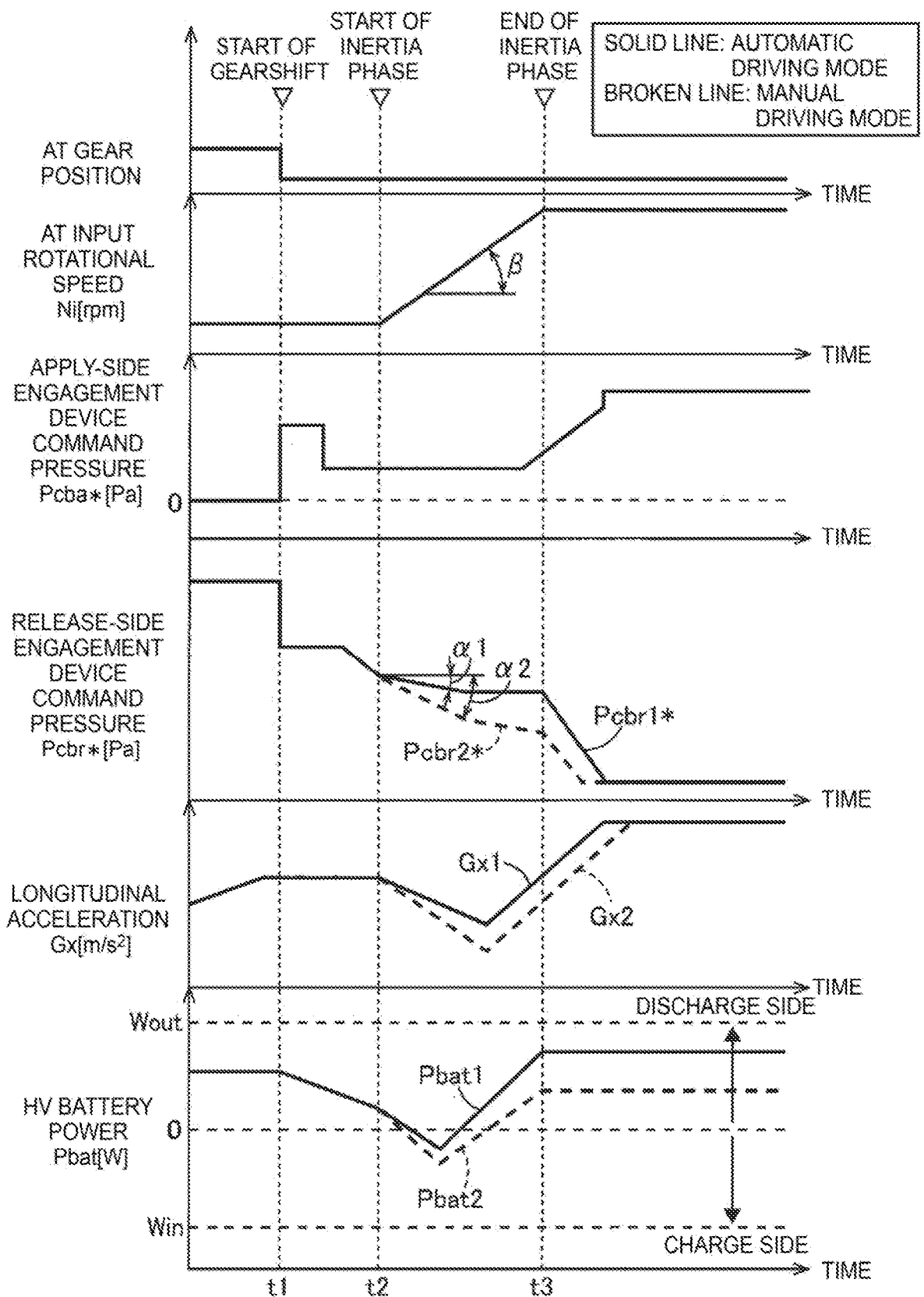
FIG. 6 is a time chart illustrating controlled conditions when the stepwise shifting unit is shifted down, during traveling in a power-ON state in which power is transmitted from the engine side, and also showing control results when the vehicle is controlled according to the flowchart of FIG. 5.

FIG. 6 is a time chart useful for describing controlled conditions at the time when the stepwise shifting unit 22 is shifted down, during traveling in the power-ON state in which power is transmitted from the engine 12 side, and corresponds to control results based on the flowchart of FIG. 5. In the time chart of FIG. 6, the vertical axis indicates the AT gear position, AT input rotational speed Ni [rpm], command pressure Pcba* [Pa] of the apply-side engagement device CBa, command pressure Pcbr* (engagement pressure) [Pa] of the release-side engagement device CBr, longitudinal acceleration Gx [m/s2] of the vehicle 10, and the HV battery power Pbat [W] as electric power generated from the battery 54, in this order as seen from the top. Since the second rotating machine MG2 is driven using the HV battery power Pbat of the battery 54, the HV battery power Pbat in FIG. 6 can be read in place of the MG2 torque Tm generated from the second rotating machine MG2. For example, as the HV battery power Pbat increases to the discharge side, the MG2 torque Tm applied to the drive side of the second rotating machine MG2 increases. In FIG. 6, solid lines correspond to a downshift during traveling in the automatic driving mode, and broken lines correspond to a downshift during traveling in the manual driving mode.

At time t1 in FIG. 6, a gearshift is started when a downshift of the stepwise shifting unit 22 is determined. At time t1, the command pressure Pcba* of the apply-side engagement device Cba to be engaged during the downshift is temporarily raised to a high pressure level (fast-fill), and is then kept at a given standby pressure until the inertia phase ends. Also, the command pressure Pcbr* of the release-side engagement device CBr to be released during the downshift is reduced to a given standby pressure, and is temporarily kept at the standby pressure. Then, the command pressure Pcbr* is reduced at a given rate.

When the inertia phase starts at time t2, the AT input rotational speed Ni starts increasing toward the post-downshift synchronous rotational speed. The control upon and after time t2 will be described, initially with respect to the case where the vehicle travels in the manual driving mode as indicated by broken lines.

When the inertia phase starts at time t2, the command pressure Pcbr2* of the release-side engagement device CBr decreases at the rate $\alpha 2$ of reduction, as indicated by a broken line. Also, during the inertia phase between time t2 and time t3, the MG2 torque Tm of the second rotating machine MG2 is controlled, so that the AT input rotational speed Ni increases at the rate of change dNi/dt, which is the given value set in advance. The MG2 torque Tm of the second rotating machine MG2 in the inertia phase during traveling in the manual driving mode substantially corresponds to the HV battery power Pbat2 indicated by a broken line. When the inertia phase ends at time t3, the command pressure Pcbr2* is reduced toward zero, so that the release-side engagement device CBr is fully released. Also, the command pressure Pcba* of the apply-side engagement device CBa is raised toward an oil pressure value at which the apply-side engagement device CBa is fully engaged, from a point immediately before the end of the inertia phase, so that the apply-side engagement device CBa is fully engaged.

Next, the downshift in the case where the vehicle travels in the automatic driving mode as indicated by the solid lines will be described. When the inertia phase starts at time t2, the command pressure Pcbr1* of the release-side engagement device CBr starts being reduced. Upon and after time t2, the rate of reduction $\alpha 1$ of the command pressure Pcbr1* indicated by a solid line is a smaller value than that ($\alpha 2$) of the command pressure Pcbr2* in the case of the manual driving mode as indicated by a broken line. Accordingly, the engagement pressure Pcbr1 of the release-side engagement device CBr in the inertia phase during traveling in the automatic driving mode is reduced at a lower rate than the engagement pressure Pcbr2 during traveling in the manual driving mode. Also, the rate of reduction $\alpha 1$ of the command pressure Pcbr1* becomes substantially zero, from a certain point in the inertia phase, and the command pressure Pcbr1* is then kept at a constant level. Thus, during traveling in the automatic driving mode, the engagement pressure Pcb 1 of the release-side engagement device CBr in the inertia phase of the downshift is higher than the engagement pressure Pcbr2 in the case during traveling in the manual driving mode. In this connection, the torque that can be transmitted through the stepwise shifting unit 22 in the inertia phase becomes larger than that in the case of the manual driving mode, and the drop of the drive torque Tr in the inertia phase is reduced as compared with the case of the manual driving mode. As a result, the drop of the longitudinal acceleration Gx1 (namely, the retraction of the acceleration G of the vehicle 10) in the case of the automatic driving mode as indicated by a solid line becomes smaller than the drop of the longitudinal acceleration Gx2 (the retraction of the acceleration G of the vehicle 10) in the case of the automatic driving mode as indicated by a broken line.

Also, in the inertia phase between time t2 and time t3, the HV battery power Pbat1 indicated by a solid line is larger on the discharge side (drive side) than the HV battery power Pbat2 in the case of the manual driving mode as indicated by a broken line, so that the AT input rotational speed Ni increases at the rate of change dNi/dt that is the same given value $\beta$ as that during traveling in the manual driving mode. Namely, in the inertia phase, the MG2 torque Tm of the second rotating machine MG2 during traveling in the automatic driving mode increases to be larger than the MG2 torque Tm of the second rotating machine MG2 during traveling in the manual driving mode. As a result, the inertia phase ends at the same point in time t3 as that in the case of the manual driving mode. Upon and after time t3, the command pressure Pcbr1* is reduced toward zero, so that the release-side engagement device CBr is fully released. Also, the command pressure Pcba* of the apply-side engagement device CBa is raised, so that the apply-side engagement device CBa is fully engaged. Thus, the MG2 torque Tm of the second rotating machine MG2 in the inertia phase is increased to be larger than that during traveling in the manual driving mode, so that the shift time in the inertia phase becomes substantially equal to that in the case during traveling in the manual driving mode, and the retraction of the acceleration G is prevented from being prolonged.

As described above, according to this embodiment, while the vehicle is traveling in the automatic driving mode, the auto-driving oil pressure changing unit 92a makes the engagement pressure Pcbr1 of the hydraulic oil supplied to the release-side engagement device CBr to be released during the downshift of the stepwise shifting unit 22, higher than the engagement pressure Pcbr2 in the case during traveling in the manual driving mode. Thus, retraction of the acceleration G due to a drop of the drive torque Tr during the downshift is reduced, and the amount of retraction of the drive torque Tr is reduced. While the shift time is likely to be prolonged since the engagement pressure Pcbr1 of the hydraulic oil supplied to the release-side engagement device CBr to be released during the downshift is made higher, the auto-driving rotating machine controller 94c makes the drive-side MG2 torque Tm generated from the second rotating machine MG2 larger than that in the case during traveling in the manual driving mode, during this period, so as to speed up the progress of the downshift. Accordingly, the shift time is prevented from being prolonged, and shock that would occur if retraction of the acceleration G lasts for a long time is reduced, so that the driver is less likely to feel uncomfortable or strange.

Also, according to this embodiment, when the stepwise shifting unit 22 is in the inertia phase of a downshift, the auto-driving oil pressure changing unit 92a sets the engagement pressure Pcbr1 of the hydraulic oil supplied to the release-side engagement device CBr to be released during the downshift, to a higher level than the engagement pressure Pcbr2 in the case during traveling in the manual driving mode, so that retraction of the acceleration G due to a drop of the drive torque Tr which occurs during the inertia phase is reduced. Also, the auto-driving oil pressure changing unit 92a reduces the rate of reduction $\alpha 1$ of the engagement pressure Pcbr1 of the hydraulic oil supplied to the release-side engagement device CBr to be released during the downshift while the vehicle is traveling in the automatic driving mode, to be smaller than the rate of reduction a2 during traveling in the manual driving mode, so that the retraction of the acceleration G due to the drop of the drive torque Tr during the downshift is reduced. Also, the auto-driving rotating machine controller 94c controls the MG2 torque Tm of the second rotating machine MG2, so that the AT input rotational speed Ni of the stepwise shifting unit 22 during the inertia phase of the downshift of the stepwise shifting unit 22 increases at the same rate (the given value β) as that in the case during traveling in the manual driving mode. Thus, the rate of progress of the gearshift in the inertia phase is substantially equal to that in the case during traveling in the manual driving mode, and the shift time in the inertia phase is prevented from being prolonged as compared with the case of the manual driving mode.

Next, another embodiment of the disclosure will be described. In the following description, the same reference signs are assigned to portions or components common to the above embodiment and this embodiment, and the portions or components will not be further described.

Second Embodiment

Figure 7:
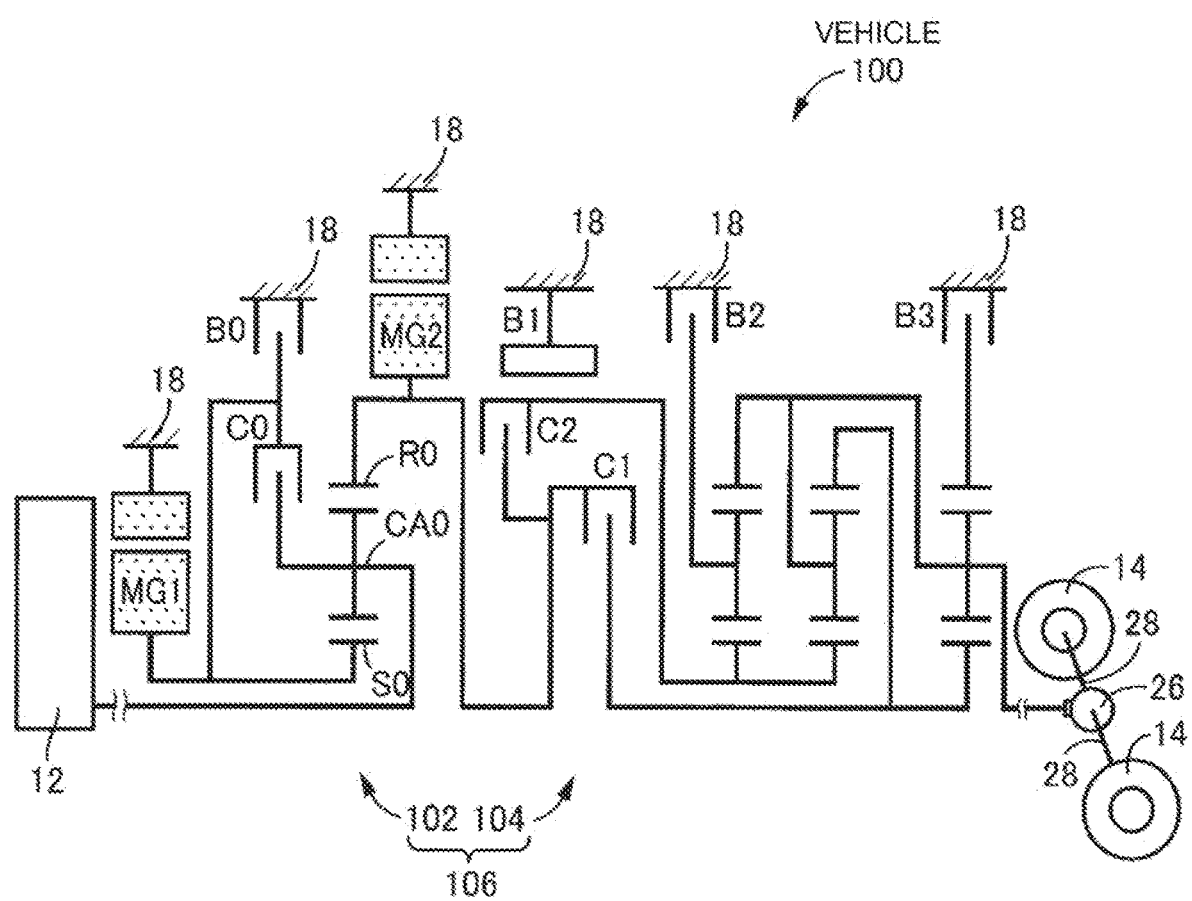
FIG. 7 is a view schematically illustrating the configuration of a vehicle to which the disclosure is applied, and which is different from the vehicle of FIG. 1.

FIG. 7 schematically illustrates the configuration of a hybrid vehicle 100 (which will be referred to as "vehicle 100") to which this disclosure is applied. The vehicle 100 is different from the vehicle 10 of the above embodiment.

In FIG. 7, an electric stepless shifting unit 102 of the vehicle 100 further includes a brake B0 and a clutch C0, as compared with the stepless shifting unit 20 of the vehicle 10. The brake B0 is provided between the sun gear S0 and the case 18, and the clutch C0 is provided between the sun gear S0 and the carrier CA0.

When the clutch C0 and the brake B0 are both released, the electric stepless shifting unit 102 operates as an electric continuously variable transmission, like the stepless shifting unit 20. On the other hand, when the clutch C0 or the brake B0 is engaged, the electric stepless shifting unit 102 is placed in a non-differential state in which it is unable to perform differential operation. In a non-differential state established by engaging the clutch C0, the electric stepless shifting unit 102 is placed in a stepwise shifting state in which it functions as a transmission of which the speed ratio γ0 is fixed to "1". In a non-differential state established by engaging the brake B0, the electric stepless shifting unit 102 is placed in a stepwise shifting state in which it functions as a speed increasing transmission of which the speed ratio γ0 is fixed to a value smaller than "1".

Like the stepwise shifting unit 22 of the vehicle 10, a mechanical stepwise shifting unit 104 of the vehicle 100 is a known planetary gear type automatic transmission including two or more planetary gear trains and two or more engagement devices. The mechanical stepwise shifting unit 104 corresponds to the transmission of the disclosure.

Like the composite transmission 40 of the vehicle 10, a composite transmission 106 as an overall transmission that is a combination of the electric stepless shifting unit 102 and the mechanical stepwise shifting unit 104 is an automatic transmission that provides a part of a power transmission path between the engine 12 and the drive wheels 14. When neither the clutch C0 nor the brake B0 is engaged, the composite transmission 106 can operate in the same manner as the composite transmission 40. When either the clutch C0 or the brake B0 is engaged, the composite transmission 106 as a whole can operate as a stepwise variable transmission having two or more gear positions having different speed ratios γt.

While the embodiments of the disclosure have been described in detail based on the drawings, the disclosure may be embodied in other forms.

In the illustrated embodiments, the vehicle 10, 100 includes the composite transmission 40, 106 that consists of the stepless shifting unit 20, 102, and the stepwise shifting unit 22, 104. However, this disclosure is not necessarily limited to the arrangement including the stepless shifting unit 20, 102. For example, the engine 12 and a rotating machine may be connected directly or indirectly via a clutch, or the like, and a stepwise shifting unit may be provided on a power transmission path between the engine 12 and rotating machine, and the drive wheels. In this arrangement, a torque converter or an input clutch may be inserted between the engine 12 and rotating machine, and the stepwise shifting unit.

While the hybrid vehicle 10, 100 has the engine 12 and the second rotating machine MG2 as driving force sources in the illustrated embodiments, this disclosure is not necessarily applied to the hybrid vehicle. More specifically, the disclosure may be applied to an electric vehicle having a rotating machine as the only driving force source. Namely, this disclosure may be applied as needed to any type of vehicle if it has a driving force source or sources including at least a rotating machine.

Also, in the illustrated embodiments, during the inertia phase of downshift, the engagement pressure Pcbr1 of the release-side engagement device CBr is controlled to be higher than the engagement pressure Pcbr2 in the case of the manual driving mode. However, during the torque phase of downshift, the engagement pressure Pcbr1 of the release-side engagement device CBr in the case of the automatic driving mode may be controlled to be higher than the engagement pressure Pcbr2 in the case of the manual driving mode.

It is to be understood that the illustrated embodiments are merely exemplary ones, and that the disclosure may be embodied with various changes and improvements, based on the knowledge of those skilled in the art.

What is claimed is:

1. A control system of a vehicle that has a driving force source including at least a rotating machine, and a transmission provided on a power transmission path between the driving force source and drive wheels, the transmission including a plurality of engagement devices and operable to be shifted to a plurality of gear positions when engagement states of the engagement devices are switched, the vehicle being operable in a manual driving mode in which the vehicle travels based on driving operation of a driver, and an automatic driving mode in which driving of the vehicle is performed without depending on the driving operation of the driver, the control system comprising:

an auto-driving oil pressure changing unit that makes an oil pressure of hydraulic oil supplied to one of the engagement devices that is released during a downshift of the transmission while the vehicle is traveling in the automatic driving mode, and during an inertia phase of the downshift of the transmission, higher than that set during traveling in the manual driving mode; and an auto-driving rotating machine controller that makes drive-side torque generated from the rotating machine in the automatic driving mode, and during the inertia phase of the downshift of the transmission, larger than torque generated during traveling in the manual driving mode, while the oil pressure of the hydraulic oil of the one of the engagement devices is made higher than that set during traveling in the manual driving mode, wherein the auto-driving rotating machine controller controls the torque of the rotating machine such that an input rotational speed of the transmission during the inertia phase of the downshift of the transmission increases at substantially the same rate as that during traveling in the manual driving mode, and the rotating machine is a motor generator.

2. The control system according to claim 1, wherein, during traveling in the automatic driving mode, the auto-driving oil pressure changing unit makes a rate of reduction of the oil pressure of the hydraulic oil supplied to the one of the engagement devices that is released during the downshift of the transmission, smaller than the rate of reduction set during traveling in the manual driving mode.

* * * * *